Figure 1:
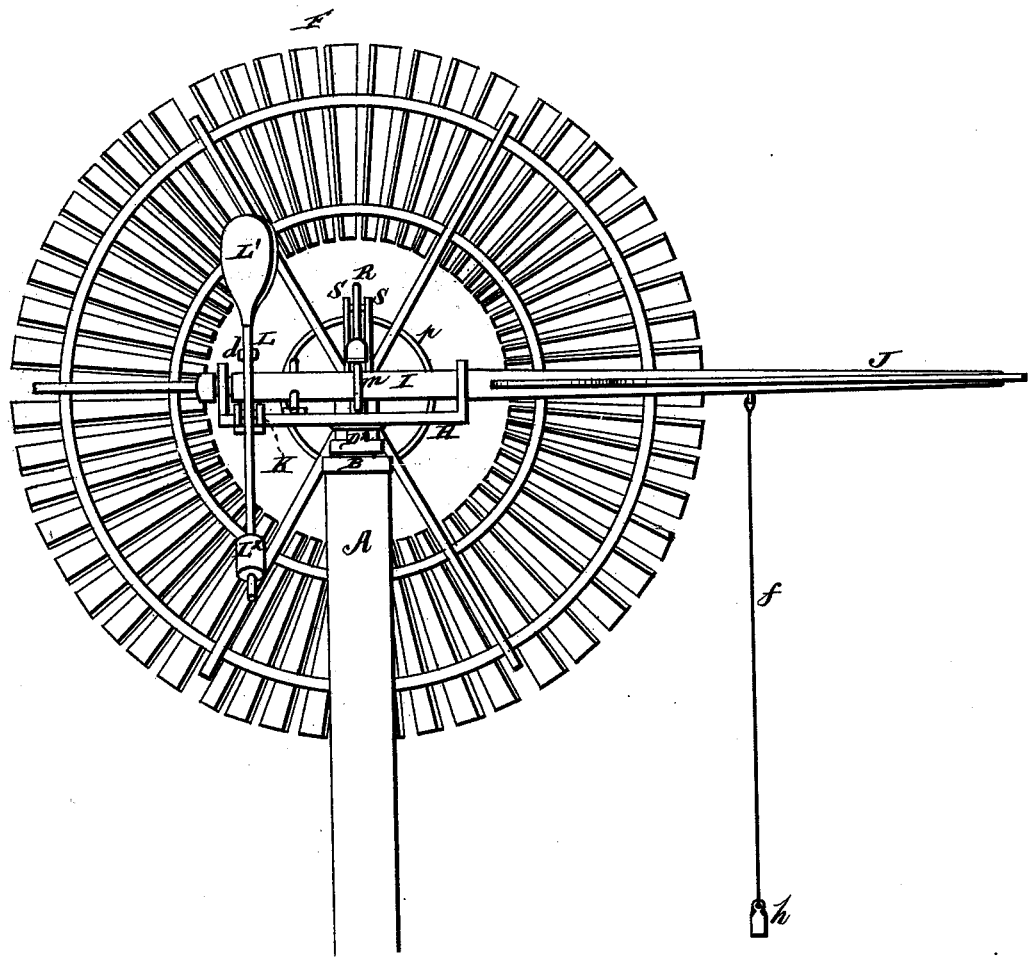

2 Sheets—Sheet 1.

C. E. MYERS.
Wind-Engines.

No. 208,841. Patented Oct. 8, 1878.

WITNESSES

INVENTOR.
Charles E. Myers.

ATTORNEYS.

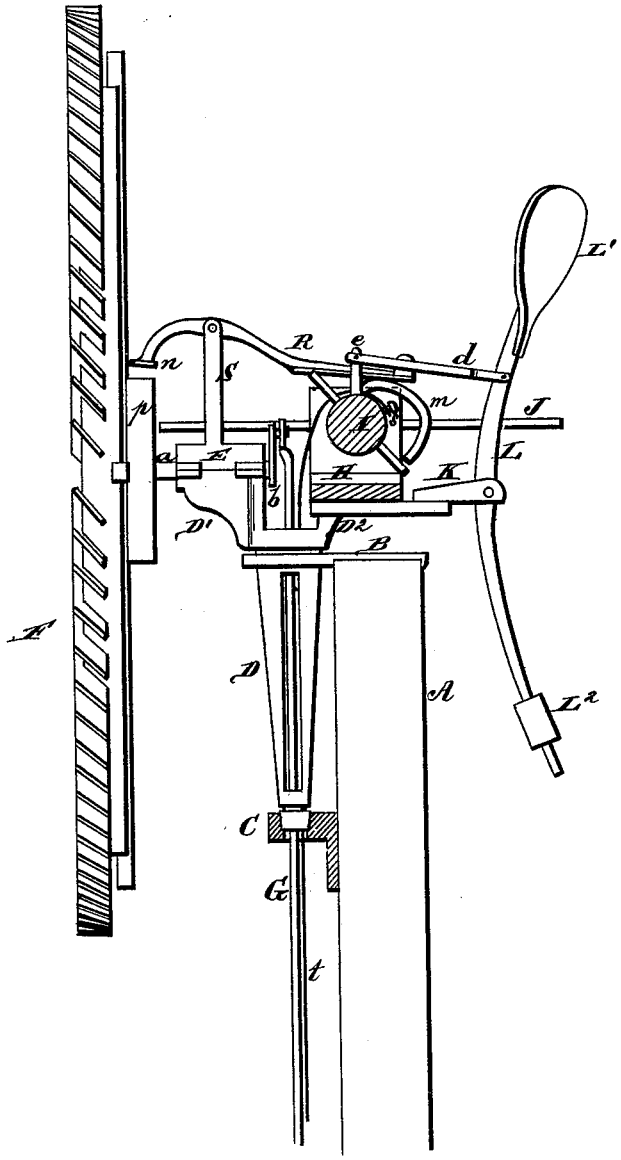

UNITED STATES PATENT OFFICE.

CHARLES E. MYERS, OF SCHOOLCRAFT, MICHIGAN.

IMPROVEMENT IN WIND-ENGINES.

Specification forming part of Letters Patent No. 208,841, dated October 8, 1878; application filed March 20, 1878.

*To all whom it may concern:*

Be it known that I, CHARLES E. MYERS, of Schoolcraft, in the county of Kalamazoo, and State of Michigan, have invented a new and valuable Improvement in Windmills; and I do hereby declare that the following is a full, clear, and exact description of the construction and operation of the same, reference being had to the annexed drawings, making a part of this specification, and to the letters and figures of reference marked thereon.

Figure 1 of the drawings is a rear view of my wind-mill, and Fig. 2 is a part sectional side view thereof.

My invention relates to windmills; and it consists in the construction and arrangement of the devices for throwing the mill out of gear; and also in combining therewith, to be operated thereby, a brake, and in the construction of such brake, all as hereinafter more fully set forth.

The annexed drawing, to which reference is made, fully illustrates my invention.

A represents the mast of the wind-mill, with cap-plate B at the top, and a step, C, a suitable distance below said cap-plate. The turn-table is composed of a hollow tapering tube, D, passing through the cap-plate B, and its lower smaller end resting in the step C. At the upper end of the tube D are formed two arms, $D^1$ and $D^2$. The arm $D^1$ forms a bearing for the shaft $a$, and over the same is placed a cap, E. On the outer end of the shaft $a$ is secured the wind-wheel F, and the inner end is provided with a crank, $b$, which works in a slotted head in the upper end of the rod G, said rod passing down through the tube D to the pump or other machinery to be driven.

On the arm $D^2$ of the turn-table is secured a frame, H, in suitable bearings upon which is placed a horizontal shaft, I, running at right angles to the wind-wheel shaft. This shaft I is at one end provided with the vane J, for throwing the wheel out of gear.

To the frame H is secured an outwardly-projecting forked arm, K, in which is pivoted a lever, L, said lever being on its upper end provided with an inclined vane, $L^1$. The lower end of the lever L is curved, as shown, and upon the same is placed a movable or adjustable weight, $L^2$. The upper portion of the lever L is, by a pivoted rod, $d$, connected with an arm, $e$, on the shaft I.

When the wheel is in gear the main vane J lies horizontal, and the wind strikes the vane $L^1$ before it strikes the wheel F. As long as the force of the wind does not overbalance the weight $L^2$, the wheel remains in gear or in the wind; but as soon as the force of the wind on the vane $L^1$ overbalances the weight $L^2$, said vane $L^1$ is turned forward, and, by its connection with the shaft I, turns said shaft so as to bring the vane J against the wind, and the wheel is then turned out of gear or out of the wind. As soon as the wind decreases again the weight $L^2$ turns the shaft I and vane J to their former position, and the wind throws the wheel around in gear again. But should the wind not be strong enough to turn the wheel to the wind, as sometimes happens, the operator can turn the wheel in the wind by means of a wire, chain, or cord, $f$, attached to the main vane J, and having a small weight, $h$, attached to its lower end. This weight and wire in nowise interfere with the automatic movement of the said vane.

It is obvious that, in using the cord $f$ for the purpose above mentioned, it must be passed over the vane from the front side, and be suspended from the rear side next the wheel. The operator thereby secures a leverage from both wings of the vane, and is enabled to move the same with great ease.

On the shaft I is secured or formed a cam, $m$, which is to operate against the weighted end of a lever, R, which is pivoted between two standards, S S, rising from the cap E, or any suitable part of the turn-table. On the inner end of the lever R is secured a brake-shoe, $n$, which is to act upon a ring, $p$, secured on the inner side of the wheel F.

When the shaft I is turned, as above described, for throwing the wheel out of the wind, the cam $m$ raises the outer weighted end of the lever R and presses the brake $n$ onto the ring $p$ with a pressure corresponding to the amount of pressure on the vane $L^1$, so as to stop the revolution of the wheel, which is many times of great importance, as the momentum of the wheel already acquired would keep it in motion for some time and might cause serious accidents. By the automatic application of a brake operated by the means for throwing the wheel out of the wind this is entirely obviated.

The operator can stop the mill at any time from the ground by means of a wire, cord, or chain, $t$, connected to an arm, $s$, on the shaft I, as shown.

As soon as the shaft I turns so as to bring the wheel in the wind, the weighted end of the lever R descends and throws the brake $n$ from contact with the ring $p$.

What I claim as new, and desire to secure by Letters Patent, is—

1. The pivoted lever L, with vane $L^1$ and weight $L^2$, connected by a rod, $d$, with an arm, $e$, on the shaft I, in combination with the vibrating vane J and wind-wheel F, said vane J being arranged at right angles to the wind-wheel shaft, and all arranged to operate substantially as and for the purposes herein set forth.

2. In a windmill, the combination, with the wind-wheel and the devices for throwing the same in and out of gear by the action of the wind, of an automatic brake applied to the wheel by the said devices for throwing the wheel in and out of gear, as herein set forth.

3. The combination, with the vanes J and $L^1$, and the shaft I, of the cam $m$, weighted lever R, with brake $n$, and the ring $p$, on the wind-wheel F, substantially as and for the purposes herein set forth.

4. The wire $f$ and weight $h$, suspended from the vane J, for the purposes set forth.

In testimony that I claim the above I have hereunto subscribed my name in the presence of two witnesses.

CHARLES E. MYERS.

Witnesses:
 JAS. J. SHEEHY,
 JOHN F. BLACKMAR.